United States Patent
Kobayashi

[11] Patent Number: 6,162,526
[45] Date of Patent: Dec. 19, 2000

[54] MAGNETIC RECORDING MEDIUM HAVING A CRYSTALIZED GLASS SUBSTRATE

[75] Inventor: Masato Kobayashi, Tokyo, Japan

[73] Assignee: Hoya Corporation, Tokyo, Japan

[21] Appl. No.: 08/916,157

[22] Filed: Sep. 2, 1997

[30] Foreign Application Priority Data

Aug. 30, 1996 [JP] Japan .................................. 8-230388

[51] Int. Cl.⁷ .................................................. G11B 5/82
[52] U.S. Cl. .................... 428/141; 428/65.3; 428/212; 428/336; 428/425.6; 428/432; 428/433; 428/694 T; 428/694 ST; 428/694 SG; 428/900
[58] Field of Search .................. 428/141, 65.3, 428/694 T, 694 ST, 694 SG, 900, 336, 212, 425.6, 432, 433

[56] References Cited

U.S. PATENT DOCUMENTS

| | | | |
|---|---|---|---|
| 4,985,306 | 1/1991 | Morizane et al. | 428/410 |
| 5,118,564 | 6/1992 | Shinohara et al. | 428/336 |
| 5,119,258 | 6/1992 | Tsai et al. | 360/135 |
| 5,413,873 | 5/1995 | Mizukami | 428/611 |
| 5,476,821 | 12/1995 | Beall et al. | 501/10 |
| 5,494,721 | 2/1996 | Nakagawa et al. | 428/64.1 |
| 5,766,727 | 6/1998 | Moroishi et al. | 428/141 |
| 5,766,756 | 6/1998 | Goda et al. | 428/332 |
| 5,830,584 | 11/1998 | Chen et al. | 428/611 |
| 5,879,783 | 3/1999 | Chang et al. | 428/141 |

OTHER PUBLICATIONS

Growing Single Crystal Epitaxial Films on Insulators IBM Technical Disclosure Bulletin, Nov. 1963 vol. 6 issue 6 pp. 37–38.

*Primary Examiner*—Stevan A. Resan
*Attorney, Agent, or Firm*—Sughrue, Mion, Zinn, Macpeak & Seas, PLLC

[57] ABSTRACT

A magnetic recording medium comprises a nonmagnetic substrate (1) of a crystallizable material and a lamina including at least a magnetic layer (3) formed thereon. The nonmagnetic substrate has a surface specified by a predetermined crystal grain size while the magnetic layer (3) has a magnetic crystal grain size dependent on the predetermined crystal size. The lamina may include an underlying layer (2) which is formed between the nonmagnetic substrate (1) and the magnetic layer (3) and which has a thickness selected to control the magnetic crystal grain size of the magnetic layer (3). The lamina may further comprise an intermediate layer (6) formed between the underlying layer (2) and the magnetic layer (3). Alternatively, an initial layer (7) may be formed between the nonmagnetic substrate (1) and the underlying layer (2).

28 Claims, 2 Drawing Sheets

MAGNETIC RECORDING MEDIUM HAVING A CRYSTALIZED GLASS SUBSTRATE

BACKGROUND OF THE INVENTION

This invention relates to a magnetic recording medium for use in a magnetic disk apparatus and a method of manufacturing the same.

In recent years, a very high recording density has been required for a magnetic recording medium, such as a hard disk.

Generally, a magnetic recording medium such as a hard disk comprises an underlying layer, a magnetic layer, and a protection layer successively formed on a nonmagnetic substrate. Recording and reproducing operations are carried out by making a head slider with a magnetic head mounted thereon run in a floating state on the magnetic recording medium. In order to realize the magnetic recording medium which has a higher recording density, it is important to achieve, in addition to high coercive force of the magnetic layer, low floating height of the head slider, and high durability against CSS (Contact Start and Stop). Specifically, it is necessary to reduce the distance between the magnetic head and the magnetic layer during the recording and the reproducing operations by achieving the low floating height of the head slider so that the recording and the reproducing operations are carried out with high density. Such low floating height results in a drastic increase in physical and mechanical load applied to the magnetic head and magnetic recording medium when a sliding state and the floating state are repeatedly switched from one to another (CSS) at the time of start and stop of running of the head slider. Under the circumstances, it is also necessary to improve the durability of the magnetic head and the magnetic recording medium at the CSS (improvement in CSS durability). In addition, with the increase in recording density, the demand for suppression of noise upon the reproducing operation becomes more and more strict.

On the other hand, an aluminum alloy substrate has been traditionally used as the nonmagnetic substrate. Recently, a glass substrate is Increasingly attracting attention. This is because that the glass is excellent in physical and chemical durability. This means that the glass substrate has a sufficient hardness to meet the recent trend of reduction in diameter and thickness of the hard disk. Furthermore, the glass has a nature such that its surface can be relatively easily formed with high accuracy. Thus, the glass is found to be suitable in realization of the higher recording density.

However, the above-described conventional method does not fully satisfy those severe demands in recent years. In particular, in order to carry out the recording and the reproducing operations with high density, it is essential to reduce medium noise and to increase an S/Nm ratio. For this purpose, a magnetic crystal grain size of the magnetic layer must be controlled. In the conventional method, however, restriction is imposed in controlling the magnetic crystal grain size of the magnetic layer to a more appropriate size.

SUMMARY OF THE INVENTION

It is therefore an object of the present invention to provide a magnetic recording medium which has an excellent magnetic characteristic.

It is another object of this invention to provide a method of manufacturing a magnetic recording medium, which can control a magnetic crystal grain size of a magnetic layer to a more appropriate size and which can therefore provide an excellent magnetic characteristic.

According to an aspect of this invention, there is provided a magnetic recording medium comprising a nonmagnetic substrate of a crystallizable material and a lamina including at least a magnetic layer formed thereon. The nonmagnetic substrate has a surface specified by a predetermined crystal grain size while the magnetic layer has a magnetic crystal grain size dependent on the predetermined crystal grain size.

According to another aspect of this invention, there is also provided a method of manufacturing a magnetic recording medium which comprises a magnetic layer formed on a nonmagnetic substrate of a crystallizable material. The method comprises the steps of selecting the nonmagnetic substrate which has a surface of a predetermined crystal grain size, to thereby control a magnetic crystal grain size of the magnetic layer.

DESCRIPTION OF THE PREFERRED EMBODIMENTS

Figure 1:
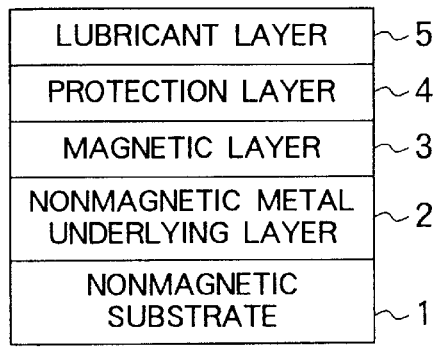
FIG. 1 is a schematic sectional view showing the structure of a magnetic recording medium according to each of Examples 1 through 21.

Now, description will be made as regards a magnetic recording medium and a method of manufacturing the same according to an embodiment of this invention with reference to the drawing.

EXAMPLES 1–3

Referring to FIG. 1, a magnetic recording medium according to each of Examples 1 through 3 comprises a nonmagnetic substrate 1, a nonmagnetic metal underlying layer 2, a magnetic layer 3, a protection layer 4, and a lubricant layer 5. These layers 1 through 5 are successively deposited.

The illustrated nonmagnetic substrate 1 is composed of a crystallized glass and has a surface polished to a center line average roughness Ra on the order of 10 nm or less. Three kinds of the crystallized glass having average crystal grain sizes of 20 nm, 15 nm, and 10 nm, were prepared to fabricate Examples 1 through 3, respectively. In the examples, the center line average roughness Ra of the surface of the crystallized glass was evaluated by an atomic force microscope (AFM). The average crystal grain size of the crystallized glass was measured by plane observation using a transmission electron microscope (TEM).

As the nonmagnetic substrate 1, the crystallized glass having the following composition was used.

| | |
|---|---|
| $SiO_2$ | 75.5 wt % |
| $Al_2O_3$ | 3.8 wt % |
| $P_2O_5$ | 1.9 wt% |
| $Li_2O$ | 10.3 wt % |

-continued

| | |
|---|---|
| $K_2O$ | 3.9 wt % |
| MgO | 2.5 wt % |
| ZnO | 0.5 wt % |
| $As_2O_3$ | 0.5 wt % |
| main crystal | lithium disilicate and α-cristobalite |

For example, the above-mentioned crystallized glass was obtained in the following manner. A given batch was melted in a platinum crucible for several hours to be sufficiently homogenized, and then formed into a glass plate. The glass plate was held at a temperature between 550° C. and 750° C. for 0.5 to 4 hours so that crystal nuclei for crystal growth were formed in the glass. Thus, nucleus formation was carried out (primary crystallization process). Then, it was held at a temperature between 750° C. and 1200° C. for 0.5 to 5 hours to perform crystallization (secondary crystallization process). Thereafter, slow cooling was performed to obtain the crystallized glass.

Such a crystallized glass which includes lithium disilicate as the main crystal can also be obtained by a glass composition falling within the following range.

| | |
|---|---|
| $SiO_2$ | 60–87 wt % |
| $Al_2O_3$ | 0–10 wt % |
| $P_2O_5$ | 0.5–8 wt % |
| $Li_2O$ | 5–20 wt % |
| $Na_2O$ | 0–5 wt % |
| $K_2O$ | 0–10 wt % |
| $Na_2O + K_2O$ | 0.5–10 wt % |
| MgO | 0.5–7.5 wt % |
| CaO | 0–9.5 wt % |
| SrO | 0–15 wt % |
| BaO | 0–13 wt % |
| ZnO | 0–13 wt % |
| $B_2O_3$ | 0–10 wt % |
| $TiO_2$ | 0–5 wt % |
| $ZrO_2$ | 0–3 wt % |
| $SnO_2$ | 0–3 wt % |
| $As_2O_3 + Sb_2O_3$ | 0–2 wt % |
| flouride of at least one metal element in the above-mentioned metal oxides | 0–5 wt % in terms of the total amount of F |
| as a coloring component, at least one selected from the group consisting of $V_2O_5$, CuO, $MnO_2$, $Cr_2O_3$, CoO, $MoO_3$, NiO, $Fe_2O_3$, $TeO_2$, $CeO_2$, $Pr_2O_3$, $Nd_2O_3$, $Er_2O_3$ | 0–5 wt % |
| main crystal | lithium disilicate (including α-cristobalite, α-quartz, lithium monosilicate, β-spodumene depending upon circumstances) |
| crystal grain size | not greater than 3.0 μm |

Such crystallized glass may include a different type of crystal. For example, the crystallized glass is given by the following composition.

| | |
|---|---|
| $SiO_2$ | 62.9 wt % |
| $Al_2O_3$ | 2.0 wt % |
| $Na_2O$ | 7.6 wt % |
| $K_2O$ | 8.4 wt % |
| MgO | 0.1 wt % |
| CaO | 18.3 wt % |
| F | 5.2 wt % |
| main crystal | canasite |

Furthermore, another example including a similar crystal can also be obtained by the following composition.

| | |
|---|---|
| $SiO_2$ | 56.6 wt % |
| $Na_2O$ | 5.4 wt % |
| $K_2O$ | 8.7 wt % |
| MgO | 11.8 wt % |
| CaO | 14.1 wt % |
| F | 5.5 wt % |
| main crystal | potassium fluorrichterite and canasite |

Such a crystallized glass including canasite as the main crystal can be obtained by a glass composition falling within the following range.

| | |
|---|---|
| $SiO_2$ | 45–75 wt % |
| CaO | 4–30 wt % |
| $Na_2O$ | 2–15 wt % |
| $K_2O$ | 0–20 wt % |
| $Al_2O_3$ | 0–7 wt % |
| MgO | 0–2 wt % |
| ZnO | 0–2 wt % |
| $SnO_2$ | 0–2 wt % |
| $Sb_2O_3$ | 0–1 wt % |
| $B_2O_3$ | 0–6 wt % |
| $ZrO_2$ | 0–12 wt % |
| $Li_2O$ | 0–3 wt % |
| flouride of at least one metal element in the above-mentioned metal oxides | 3–12 wt % in terms of the total amount of F |
| coloring component | including $Cr_2O_3$, $Co_3O_4$, and so on depending upon the case |
| main crystal | including canasite or potassium fluorrichterite |

Furthermore, another type of crystallized glass may be used which includes the following composition.

| | |
|---|---|
| $SiO_2$ | 41.9 wt % |
| $Al_2O_3$ | 28.7 wt % |
| $K_2O$ | 2.2 wt % |
| ZnO | 22.5 wt % |
| $TiO_2$ | 4.7 wt % |
| F | 5.5 wt % |
| main crystal | spinel |

Such a crystallized glass including spinel as the main crystal can also be given by a glass composition which falls within the following range.

| | |
|---|---|
| $SiO_2$ | 35–60 wt % |
| $Al_2O_3$ | 20–35 wt % |
| MgO | 7–25 wt % |
| ZnO | 0–25 wt % |
| MgO + ZnO | not less than 10 wt % |
| $TiO_2$ | 0–20 wt % |
| $ZrO_2$ | 0–10 wt % |

-continued

| | |
|---|---|
| Li$_2$O | 0–2 wt % |
| NiO | 0–8 wt % |
| at least one selected from BaO, CaO, PbO, SrO, P$_2$O$_5$, B$_2$O$_3$, Ga$_2$O$_3$ | 0–5 wt % |
| at least one selected from the group consisting of Na$_2$O, K$_2$O, Rb$_2$O, and Ca$_2$O | 0–5 wt % |
| transition metal oxide | 0–8 wt % |
| main crystal | spinel |
| crystal grain size | 0.1 μm or less |

In addition, a different type of crystallized glass can also be used which includes the following composition.

| | |
|---|---|
| SiO$_2$ | 61.0 wt % |
| Al$_2$O$_3$ | 10.1 wt % |
| Li$_2$O | 2.0 wt % |
| Na$_2$O | 18.3 wt % |
| K$_2$O | 5.0 wt % |
| CaO | 2.0 wt % |
| BaO | 0.5 wt % |
| ZrO$_2$ | 1.1 wt % |
| main crystal | calcium sulfate, barium sulfate |

Such a crystallized glass including the above-mentioned crystal can also be obtained by a glass composition which falls within the following range.

| | |
|---|---|
| SiO$_2$ | 58–85 wt % |
| R$_2$O | 2–25 wt % (R representing alkali metal) |
| BaO | 0.2–20 wt % |
| CaO | 0.2–20 wt % |
| Al$_2$O$_3$ | 0.5–15 wt % |
| ZrO$_2$ | 0.1–6 wt % |
| SO$_3$ | 0.1–3 wt % |
| halogen ion | 0.1–6 wt % |
| main crystal | calcium sulfate, barium sulfate |

In addition, the crystallized glass may include a crystal different from the above-enumerated crystals. For example, such crystallized glass may include the following composition.

| | |
|---|---|
| SiO$_2$ | 40.0 wt % |
| Al$_2$O$_3$ | 16.9 wt % |
| MgO | 13.0 wt % |
| CaO | 5.8 wt % |
| BaO | 0.7 wt % |
| ZnO | 16.1 wt % |
| As$_2$O$_3$ | 0.5 wt % |
| TiO$_2$ | 7.0 wt % |
| main crystal | gahnite |
| crystal grain size | 7–55 nm |

The crystallized glass including the above-mentioned crystal can be obtained by a glass composition which falls within the following composition.

| | |
|---|---|
| SiO$_2$ | 40–60 wt % |
| A$_2$O$_3$ | 7–27 wt % |
| ZnO | 5–25 wt % |
| MgO | 1–15 wt % |
| CaO | 0–15 wt % |
| SrO + BaO | 0–5 wt % |
| CaO + SiO + BaO | 1–15 wt % |
| TiO$_2$ | 1–10 wt % |
| B$_2$O$_3$ | 0–5 wt % |
| P$_2$O$_5$ | 0–5 wt % |
| ZrO$_2$ | 0–2 wt % |
| SnO$_2$ | 0–2 wt % |
| LiO$_2$ + Na$_2$O + K$_2$O | 0–2 wt % |
| As$_2$O$_3$ + Sb$_2$O$_3$ | 0–3 wt % |
| flouride of at least one metal element in the above-mentioned metal oxides | 3–12 wt % in terms of the total amount of F |
| main crystal | gahnite |
| crystal grain size | 5–100 nm |

At any rate, the nonmagnetic substrate 1 may be formed by a selected one of the glass compositions mentioned above.

Referring back to FIG. 1, the nonmagnetic underlying layer 2 is deposited on the nonmagnetic substrate 1.

The illustrated nonmagnetic underlaying layer 2 comprises a Cr thin film having a thickness of 40 nm.

The magnetic layer 3 formed on the nonmagnetic underlying layer 2 comprises a CoPtCr alloy thin film which has a thickness of 20 nm and a composition essentially consisting of 74 at % of Co, 11 at % of Pt, and 15 at % of Cr.

The protection layer 4 comprises a C thin film containing hydrogen and having a thickness of 13 nm.

The lubricant layer 5 is formed by applying a perfluoropolyether lubricant (for example, AM2001 made by Montedision, Inc.) on the protection layer 4 by the use of a dipping method and has a film thickness of 10 angstroms.

Description will hereafter be made as regards a method of manufacturing the magnetic recording medium of the above-mentioned structure by the use of an opposed-type static sputtering apparatus.

At first, the nonmagnetic substrate 1 of the crystallized glass is attached to a substrate holder. After it is introduced into a pre-deposition chamber, the pre-deposition chamber is evacuated from an atmospheric pressure to a degree of vacuum of 5×10$^{-8}$ Torr. Thereafter, a valve between the pre-deposition chamber and a deposition chamber is opened to introduce the substrate holder into the deposition chamber. The substrate holder is transferred to a position faced to a Cr target. Next, the deposition chamber is evacuated to a degree of vacuum of 8×10$^{-9}$ Torr. At this position, the nonmagnetic substrate 1 attached to the substrate holder is heated by a lamp heater at a temperature of 300° C. for 30 minutes. After heating for 30 minutes, the nonmagnetic metal underlying layer 2 is formed under the following sputtering condition.

target: Cr (diameter of 4 inches)

gas: Ar gas pressure: 5 mTorr supply power: 200 W substrate temperature: 300° C.

distance between target and substrate: 70 mm average film thickness: 40 nm

Next, the substrate holder is transferred to another position faced to a CoPtCr target. Then, the magnetic layer 3 is formed under the following sputtering condition.

target: Co$_{74}$Pt$_{11}$Cr$_{15}$ (at %) (diameter of 4 inches)

gas: Ar
gas pressure: 20 mTorr
supply power: 100 W
substrate temperature: 300° C.
distance between target and substrate: 70 mm
average film thickness:. 20 nm Next, the substrate holder is transferred to a position faced to a C target. Then, the protection layer 4 is formed under the following sputtering condition.

target: C (diameter of 4 inches)
gas: Ar, $H_2$
gas pressure: $PAr+PH_2=10$ mTorr ($PH_2/(PAr+PH_2)=0.06$)
supply power: 500 W
substrate temperature: 300° C.
distance between target and substrate: 70 mm
average film thickness: 13 nm After the above-mentioned deposition by sputtering, the substrate 1 is taken out from the sputtering apparatus. The lubricant layer 5 is formed on the protection layer 4 by a dipping process using the perfluoropolyether lubricant. In this manner, the magnetic recording medium is obtained.

For the three kinds of the magnetic recording media (in which the average crystal grain sizes of the crystallized glasses are equal to 20 nm, 15 nm, 10 nm respectively), magnetic crystal grain sizes were measured by the plane observation using the transmission electron microscope (TEM). With respect to magnetic characteristics, coercive force Hc and product Mrt of residual magnetization and film thickness were analyzed by the use of a vibratory sample magnetometer (VSM) while the medium noise Nm and the S/Nm ratio were analyzed by the use of a recording/reproducing characteristic evaluation apparatus. The results of these analyses are collectively shown in Table 1.

TABLE 1

| Example | Crystal Grain Size of Crystallized Glass (nm) | Magnetic Crystal Grain Size of Magnetic Layer (nm) | Hc (Oe) | Mrt (memu/cm$^2$) | Nm ($\mu$Vrms) | S/Nm (dB) |
| --- | --- | --- | --- | --- | --- | --- |
| 1 | 20.3 | 21.1 | 2310 | 0.89 | 7.7 | 29.9 |
| 2 | 14.8 | 15.8 | 2530 | 0.90 | 7.0 | 31.4 |
| 3 | 10.2 | 11.0 | 2320 | 0.91 | 6.4 | 31.9 |

Table 1 shows a crystal grain size of a crystallized glass, a magnetic crystal grain size of a magnetic layer, coercive force Hc, product Mrt of residual magnetization and film thickness, medium noise Nm, and an S/Nm ratio for each of Examples 1 through 3.

The magnetic recording media were subjected to running tests at a head floating height of 0.050 $\mu$m. The results were excellent.

The S/Nm ratio was evaluated in a following manner. Use was made of an MR (magneto-resistive) head having a floating height of 0.050 $\mu$m. Recording and reproducing outputs were measured at a track recording density of 125 kfci with a relative speed kept at 6.5 m/s. Then, a noise spectrum of each magnetic recording medium was measured during signal recording and reproducing by the use of a spectrum analyzer which had a carrier frequency and a measuring bandwidth of 23.5 MHz and 26.5 MHz, respectively. The MR head used in this measurement had a recording track width of 4.1 $\mu$m, a reproducing track width of 3.1 $\mu$m, a recording gap length of 0.48 $\mu$m, and a reproducing gap length of 0.30 $\mu$m It is understood that, as illustrated in Table 1, the magnetic crystal grain size of the magnetic layer 3 become smaller become with the decrease in average grain size of the crystallized glass used for the nonmagnetic substrate 1. As a result, the medium noise Nm is reduced and the S/Nm ratio is increased. In other words, it is possible to control the magnetic crystal grain size of the magnetic layer 3 as well as the medium noise Nm and the S/Nm ratio by controlling the crystal grain size of the crystallized glass used for the nonmagnetic substrate 1. The crystallized glass used for the nonmagnetic substrate is required to have an average crystal grain size within a range between 3 and 28 nm. The magnetic layer 3 is required to have a magnetic crystal grain size within a range between 5 and 30 nm.

Further referring to Table 1, it is found out that the magnetic crystal grain size of the magnetic layer 3 tends to become large by about 1 nm in comparison with the crystal grain size of the crystallized glass used for the nonmagnetic substrate 1. It is also found out that the degree of increase of the magnetic crystal grain size of the magnetic layer 3 with respect to the crystal grain size of the crystallized glass used for the nonmagnetic substrate 1 depends on the thickness of the Cr film formed as the nonmagnetic underlying layer 2.

Figure 2:
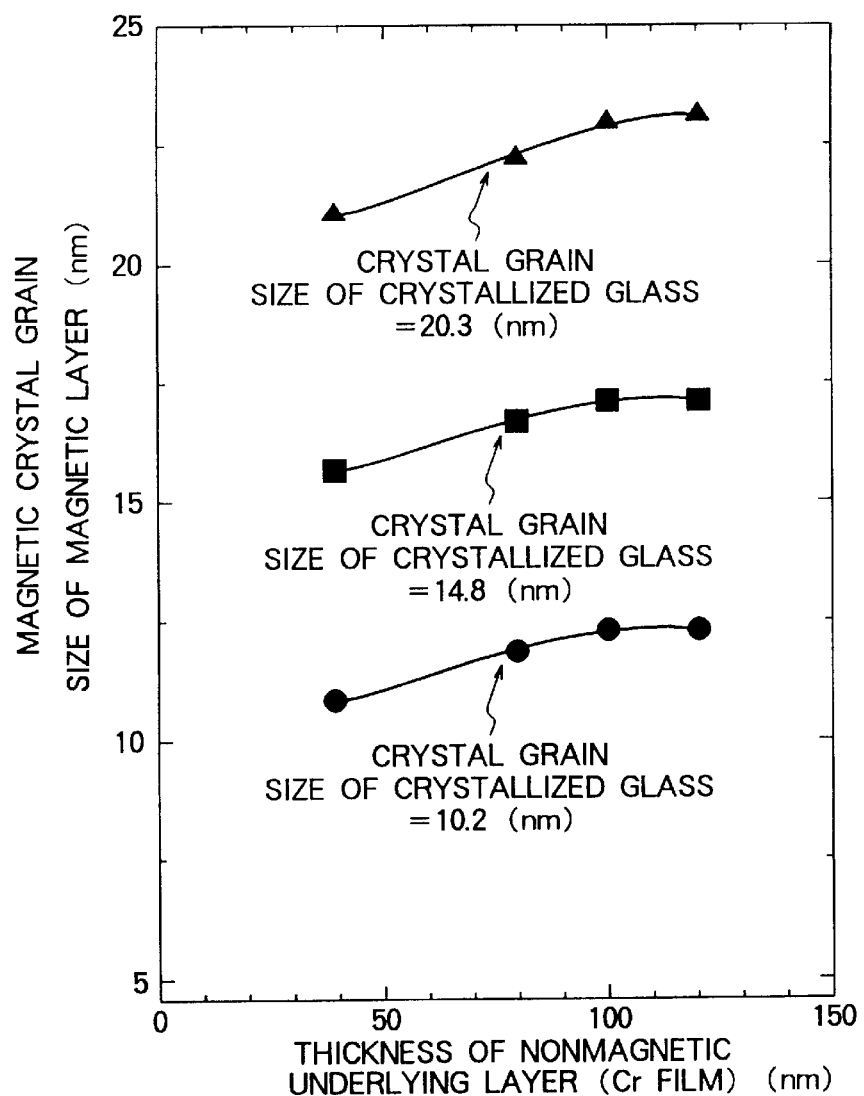
FIG. 2 is a graph showing a dependency of the magnetic crystal grain size upon the thickness of an underlying layer in each of Examples 1 through 3.

FIG. 2 shows the dependency of the magnetic crystal grain size of the magnetic layer 3 upon the thickness of the underlying layer (Cr film) when the crystallized glass used for the nonmagnetic substrate 1 has the crystal grain size of 10.2 nm, 14.8 nm, and 20 nm. In either case, it is understood that the magnetic grain size of the magnetic layer 3 is increased with the increase of a film thickness of the nonmagnetic underlying layer (Cr film). However, the increase tends to saturate when the film thickness of the nonmagnetic underlying layer (Cr film) is 100 nm or more. Preferably, the film thickness of the nonmagnetic underlying layer 2 is within a range between 100 nm and 10 nm. The film thickness of the nonmagnetic underlying layer 2 which is less than 10 nm is undesirable because of a reduction of the coercive force Hc.

EXAMPLES 4–21

Examples 4 through 21 were manufactured in a manner similar to Examples 1 through 3 except that the materials and compositions in Examples 1 through 3 were changed as follows. As for the manufacturing condition of the magnetic layer 3, materials and compositions of the targets alone were changed with all of the gas, the gas pressure, the supply power, the substrate temperature, the distance between the target and the substrate, and the film thickness unchanged.

| | composition of magnetic layer (at %) | crystal grain size of crystallized glass (nm) |
| --- | --- | --- |
| Example 4 | $Co_{79}Pt_{11}Cr_{10}$ | 20.3 |
| Example 5 | $Co_{79}Pt_{11}Cr_{10}$ | 14.8 |
| Example 6 | $Co_{79}Pt_{11}Cr_{10}$ | 10.2 |
| Example 7 | $Co_{69}Pt_{11}Cr_{20}$ | 20.3 |
| Example 8 | $Co_{69}Pt_{11}Cr_{20}$ | 14.8 |
| Example 9 | $Co_{69}Pt_{11}Cr_{20}$ | 10.2 |
| Example 10 | $Co_{76}Pt_{11}Cr_{11}Ta_2$ | 20.3 |
| Example 11 | $Co_{76}Pt_{11}Cr_{11}Ta_2$ | 14.8 |
| Example 12 | $Co_{76}Pt_{11}Cr_{11}Ta_2$ | 10.2 |
| Example 13 | $Co_{74}Pt_{11}Cr_{11}W_4$ | 20.3 |
| Example 14 | $Co_{74}Pt_{11}Cr_{11}W_4$ | 14.8 |
| Example 15 | $Co_{74}Pt_{11}Cr_{11}W_4$ | 10.2 |
| Example 16 | $(Co_{75}Pt_{11}Cr_{11})_{97}(SiO_2)_3$ | 20.3 |
| Example 17 | $(Co_{75}Pt_{11}Cr_{11})_{97}(SiO_2)_3$ | 14.8 |

-continued

| | composition of magnetic layer (at %) | crystal grain size of crystallized glass (nm) |
|---|---|---|
| Example 18 | $(Co_{75}Pt_{11}Cr_{11})_{97}(SiO_2)_3$ | 10.2 |
| Example 19 | $(Co_{72}Pt_{11}Cr_{11})_{94}(SiO_2)_6$ | 20.3 |
| Example 20 | $(Co_{72}Pt_{11}Cr_{11})_{94}(SiO_2)_6$ | 14.8 |
| Example 21 | $(Co_{72}Pt_{11}Cr_{11})_{94}(SiO_2)_6$ | 10.2 |

Table 2 collectively shows, together with the composition of the magnetic layer 3, the crystal grain size of the crystallized glass, the magnetic crystal grain size of the magnetic layer 3 and the results of evaluation of the coercive force Hc, the product Mrt of residual magnetization and film thickness, the medium noise Nm, and the S/Nm ratio for each of the magnetic recording media in Examples 4 through 21. The evaluation was carried out by the method used in Examples 1 through 3.

As will be understood from in Table 2, the smaller the crystal grain size of the crystallized glass is, the smaller the magnetic grain size of the magnetic layer 3 formed thereon becomes, even if the materials and the compositions of the magnetic layer 3 are changed. As a result, the medium noise is reduced and the S/Nm ratio is increased. It is also understood that the degree of increase of the magnetic crystal grain size with respect to the average grain size of the crystallized glass hardly depends on the material and the composition of the magnetic layer 3.

is composed of a Cr alloy ($Cr_{95}Mo_5$, $Cr_{90}V_{10}$). The intermediate layer 6 has a thickness of 4 nm.

In Examples 22 through 24, $Cr_{95}Mo_5$ is used as the Cr alloy and the crystal grain size of the crystallized glass is equal to 20.3 nm, 14.8 nm, 10.2 nm, respectively. In Examples 25 through 27, $Cr_{90}V_{10}$ is used as the Cr alloy and the crystal grain size of the crystallized glass is equal to 20.3 nm, 14.8 nm, 10.2 nm, respectively.

The magnetic recording medium was manufactured in the manner similar to Examples 1 through 3 except that the intermediate layer 6 is formed. The condition of forming the intermediate layer 6 is as follows.

target: $Cr_{95}Mo_5$, $Cr_{90}V_{10}$ (diameter of 4 inches)
gas: Ar
gas pressure: 5 mTorr
supply power: 200 W
substrate temperature: 300° C.
distance between target and substrate: 70 mm
average film thickness: 4 nm As regards each of the magnetic recording media in Examples 22 through 27 manufactured in the above-mentioned manner, Table 3 collectively shows the composition of the intermediate layer 6, the crystal grain size of the crystallized glass, the magnetic crystal grain size of the magnetic layer 3 and the results of evaluation of the coercive force Hc, the product Mrt of residual magnetization and film thickness, the medium noise Nm, and the S/Nm ratio. The evaluation was carried out by the method used in Examples 1 through 3.

TABLE 2

| Example | Composition of Magnetic Layer (at %) | Crystal Grain Size of Crystallized Glass (nm) | Magnetic Crystal Grain Size of Magnetic Layer (nm) | Hc (Oe) | Mrt (memu/cm²) | Nm (μVrms) | S/Nm (dB) |
|---|---|---|---|---|---|---|---|
| 4 | $Co_{79}Pt_{11}Cr_{10}$ | 20.3 | 21.0 | 2010 | 1.01 | 8.7 | 29.0 |
| 5 | $Co_{79}Pt_{11}Cr_{10}$ | 14.8 | 15.7 | 2150 | 1.02 | 8.1 | 30.2 |
| 6 | $Co_{79}Pt_{11}Cr_{10}$ | 10.2 | 11.0 | 2030 | 1.03 | 7.5 | 30.5 |
| 7 | $Co_{69}Pt_{11}Cr_{20}$ | 20.3 | 21.3 | 2450 | 0.70 | 6.7 | 29.8 |
| 8 | $Co_{69}Pt_{11}Cr_{20}$ | 14.8 | 15.8 | 2640 | 0.71 | 6.0 | 31.0 |
| 9 | $Co_{69}Pt_{11}Cr_{20}$ | 10.2 | 11.1 | 2400 | 0.71 | 5.5 | 31.5 |
| 10 | $Co_{76}Pt_{11}Cr_{11}Ta_2$ | 20.3 | 20.8 | 2200 | 0.86 | 7.5 | 30.3 |
| 11 | $Co_{76}Pt_{11}Cr_{11}Ta_2$ | 14.8 | 15.5 | 2350 | 0.90 | 6.8 | 31.8 |
| 12 | $Co_{76}Pt_{11}Cr_{11}Ta_2$ | 10.2 | 10.8 | 2220 | 0.91 | 6.1 | 32.1 |
| 13 | $Co_{74}Pt_{11}Cr_{11}W_4$ | 20.3 | 20.9 | 2230 | 0.86 | 7.4 | 30.3 |
| 14 | $Co_{74}Pt_{11}Cr_{11}W_4$ | 14.8 | 15.5 | 2390 | 0.91 | 6.8 | 31.7 |
| 15 | $Co_{74}Pt_{11}Cr_{11}W_4$ | 10.2 | 10.9 | 2270 | 0.91 | 6.2 | 32.1 |
| 16 | $(Co_{75}Pt_{11}Cr_{11})_{97}(SiO_2)_3$ | 20.3 | 20.6 | 2300 | 0.88 | 7.3 | 30.3 |
| 17 | $(Co_{75}Pt_{11}Cr_{11})_{97}(SiO_2)_3$ | 14.8 | 15.3 | 2500 | 0.90 | 6.5 | 32.0 |
| 18 | $(Co_{75}Pt_{11}Cr_{11})_{97}(SiO_2)_3$ | 10.2 | 10.7 | 2320 | 0.90 | 5.8 | 32.6 |
| 19 | $(Co_{72}Pt_{11}Cr_{11})_{94}(SiO_2)_6$ | 20.3 | 20.6 | 2450 | 0.82 | 6.2 | 31.8 |
| 20 | $(Co_{72}Pt_{11}Cr_{11})_{94}(SiO_2)_6$ | 14.8 | 15.2 | 2650 | 0.83 | 5.6 | 33.3 |
| 21 | $(Co_{72}Pt_{11}Cr_{11})_{94}(SiO_2)_6$ | 10.2 | 10.6 | 2450 | 0.83 | 5.0 | 33.9 |

EXAMPLES 22–27

Figure 3:
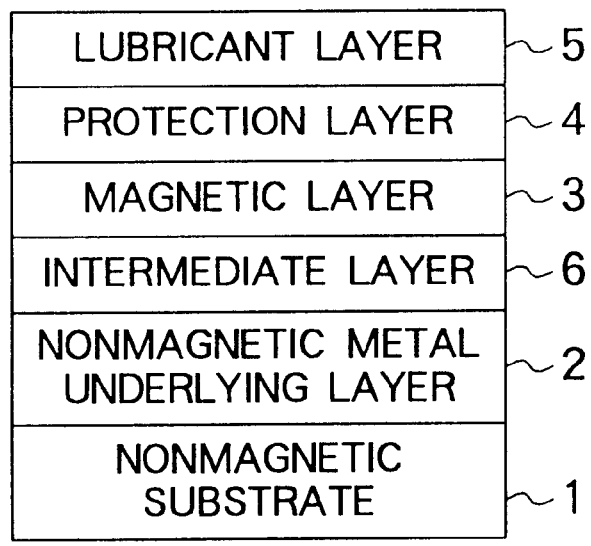
FIG. 3 is a schematic sectional view showing the structure of a magnetic recording medium in each of Examples 22 through 27.

Referring to FIG. 3, a magnetic recording medium according to each of Examples 22 through 27 comprises a nonmagnetic substrate 1, a nonmagnetic metal underlying layer 2, an intermediate layer 6, a magnetic layer 3, a protection layer 4, and a lubricant layer 5. These layers are successively deposited. Similar parts corresponding to those in FIG. 1 are designated by same reference numerals. Those layers except the intermediate layer 6 are similar to those of Examples 1 through 3 and the description thereof will be omitted.

The intermediate layer 6 is formed between the nonmagnetic metal underlying layer 2 and the magnetic layer 3 and

TABLE 3

| Example | Composition of Intermediate Layer (at %) | Crystal Grain Size of Crystallized Glass (nm) | Magnetic Crystal Grain Size of Magnetic Layer (nm) | Hc (Oe) | Mrt (memu/cm²) | Nm (μVrms) | S/Nm (dB) |
|---|---|---|---|---|---|---|---|
| 22 | $Cr_{95}Mo_5$ | 20.3 | 21.1 | 2400 | 0.90 | 7.4 | 30.2 |
| 23 | $Cr_{95}Mo_5$ | 14.8 | 15.8 | 2580 | 0.90 | 6.8 | 31.7 |

TABLE 3-continued

| Example | Composition of Intermediate Layer (at %) | Crystal Grain Size of Crystallized Glass (nm) | Magnetic Crystal Grain Size of Magnetic Layer (nm) | Hc (Oe) | Mrt (memu/cm$^2$) | Nm ($\mu$Vrms) | S/Nm (dB) |
|---|---|---|---|---|---|---|---|
| 24 | $Cr_{95}Mo_5$ | 10.2 | 11.1 | 2380 | 0.91 | 6.2 | 32.1 |
| 25 | $Cr_{90}V_{10}$ | 20.3 | 21.0 | 2410 | 0.89 | 7.3 | 30.3 |
| 26 | $Cr_{90}V_{10}$ | 14.8 | 15.9 | 2550 | 0.90 | 6.7 | 31.8 |
| 27 | $Cr_{90}V_{10}$ | 10.2 | 10.9 | 2380 | 0.90 | 6.3 | 32.0 |

It will be understood from Table 3 that, as the crystal grain size of the crystallized glass becomes fine, the magnetic crystal grain size of the magnetic layer 3 formed thereon also becomes fine, even if the intermediate layer 6 is formed between the nonmagnetic metal underlying layer 2 and the magnetic layer 3. This results in both a reduction of the medium noise and an increase of the S/Nm ratio. It is also understood that the degree of increase of the magnetic crystal grain size with respect to the average grain size of the crystallized glass hardly depends on the type of the intermediate layer 6.

EXAMPLES 28–36

Figure 4:
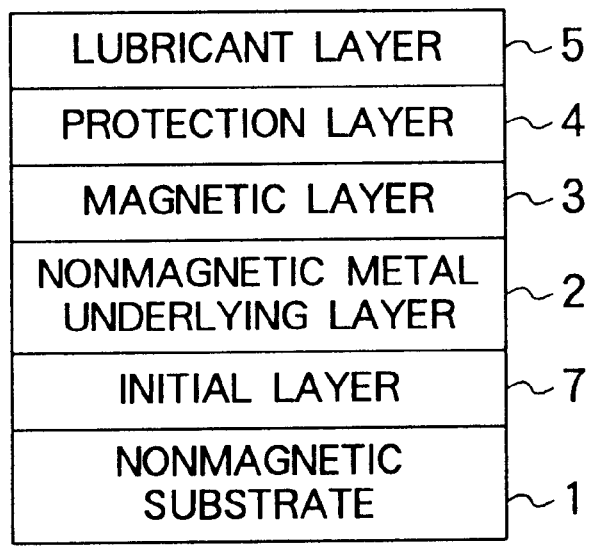
FIG. 4 is a schematic sectional view showing the structure of a magnetic recording medium in each of Examples 28 through 36.

A magnetic recording medium according to Examples 28 through 36 has a structure illustrated in FIG. 4. Specifically, the magnetic recording medium comprises a nonmagnetic substrate 1, an initial layer 7, a nonmagnetic metal underlying layer 2, a magnetic layer 3, a protection layer 4, and a lubricant layer 5, each of which is successively deposited. Similar parts corresponding to those in FIG. 1 are designated by like reference numerals. From this fact, it is readily understood that the initial layer 7 is added to those of the Examples 1 through 3 and the description will be mainly directed only to the initial layer 7.

The initial layer 7 is placed between the nonmagnetic substrate 1 and the nonmagnetic metal underlying layer 2 and comprises a thin film of any one of Al, AlN, and Ti deposited to a thickness of 5 nm.

In Examples 28 through 30, Al is used as a material of the initial layer 7 and the crystal grain size of the crystallized glass is equal to 20.3 nm, 14.8 nm, and 10.2 nm, respectively. Each of Examples 34 through 36 has the initial layer 7 of AlN and the crystallized glass having the crystal grain size of 20.3 nm (Example 34), 14.8 nm (Example 35), and 10.2 nm (Example 36).

The magnetic recording medium was manufactured in a manner similar to Examples 1 through 3 except that the initial layer 7 was formed.

The condition of forming the initial layer of Al is as follows.

target: Al (diameter of 4 inches)
gas: Ar
gas pressure: 5 mTorr
supply power: 200 W
substrate temperature: 300° C.
distance between target and substrate: 70 mm
average film thickness: 5 nm
The condition of forming the initial layer of AlN is as follows.
target: Al (diameter of 4 inches)
gas: Ar, H$_2$
gas pressure: $PAr+PN_2$=5 mTorr ($PN_2/(PAr+PN_2)$=0.20)
supply power: 200 W
substrate temperature: 300° C.
distance between target and substrate: 70 mm
average film thickness: 5 nm
The condition of forming the initial layer of Ti is as follows.
target: Ti (diameter of 4 inches)
gas: Ar
gas pressure: 5 mTorr
supply power: 200 W,
substrate temperature: 300° C.
distance between target and substrate: 70 mm
average film thickness: 5 nm Table 4 collectively shows the composition of the initial layer 7, the crystal grain size of the crystallized glass, the magnetic crystal grain size of the magnetic layer 3, and the results of evaluation of the coercive force Hc, the product Mrt of residual magnetization and film thickness, the medium noise Nm, and the S/Nm ratio for each of magnetic recording media in Examples 28 through 36 manufactured in the above-mentioned manner. The evaluation was carried out by the method used in Examples 1 through 3.

It will be understood from Table 4 that, as the crystal grain size of the crystallized glass becomes fine, the magnetic crystal grain size of the magnetic layer 3 formed thereon also becomes fine, even if the initial layer 7 is formed between the nonmagnetic substrate 1 and the nonmagnetic metal underlying layer 2. This results in both a reduction of the medium noise and

TABLE 4

| Example | Composition of Initial Layer (at %) | Crystal Grain Size of Crystallized Glass (nm) | Magnetic Crystal Grain Size of Magnetic Layer (nm) | Hc (Oe) | Mrt (memu/cm$^2$) | Nm ($\mu$Vrms) | S/Nm (dB) |
|---|---|---|---|---|---|---|---|
| 28 | Al | 20.3 | 21.0 | 2320 | 0.89 | 7.7 | 29.9 |
| 29 | Al | 14.8 | 15.9 | 2520 | 0.90 | 7.1 | 31.3 |
| 30 | Al | 10.2 | 11.1 | 2300 | 0.90 | 6.3 | 32.0 |
| 31 | $Al_{70}N_{30}$ | 20.3 | 21.2 | 2300 | 0.88 | 7.5 | 30.1 |
| 32 | $Al_{70}N_{30}$ | 14.8 | 16.0 | 2510 | 0.90 | 6.8 | 31.6 |
| 33 | $Al_{70}N_{30}$ | 10.2 | 11.0 | 2310 | 0.92 | 6.3 | 32.0 |
| 34 | Ti | 20.3 | 21.1 | 2300 | 0.89 | 7.9 | 29.7 |
| 35 | Ti | 14.8 | 16.1 | 2500 | 0.91 | 7.2 | 31.2 |
| 36 | Ti | 10.2 | 11.1 | 2300 | 0.91 | 6.6 | 31.6 | an increase of the S/Nm ratio. It is also understood that the degree of increase of the magnetic crystal grain size with respect to the average grain size of the crystallized glass hardly depends on the type of the initial layer 7.

While the present invention has thus far been described in conjunction with various examples, the present invention may include variations and modifications which will presently be described. For example, the magnetic layer 3 may be directly deposited on the nonmagnetic substrate 1. In this connection, a layer deposited on the nonmagnetic substrate 1 may be collectively called a lamina.

In the foregoing examples, the crystallized glass is used as the substrate. Use may be made of various other materials such as a carbon substrate, a silicon substrate, and a quartz substrate, as far as it is crystallizable.

Although Cr is used as the material of the underlying layer, use may be made of other nonmagnetic materials such as TiW, Mo, Ti, Ta, W, Zr, Cu, A, Zu, In, and Sn.

It is also possible to form the magnetic layer by the use of various magnetic materials including Co alloys such as CoNiCrTa, CoNiPt, CoNiZr, CoCrPt, CoPt, CoCrPtB, and CoP and $Fe_2O_3$, in addition to those described in Examples.

In the foregoing examples, Al, AlN, or Ti is used as the initial layer. Use may be made of a thin film of, for example, a metal material such as Sn, In, and Zn, an alloy at least containing one of these metal materials, oxide and nitride thereof.

In the Examples described above, the opposed-type static sputtering apparatus is used. As will readily be understood, each layer can be formed by the use of a different sputtering apparatus or a deposition apparatus.

In the Examples, perfluoropolyether is used as the material of the lubricant layer. However, use can be made of a hydrocarbon or fluorocarbon liquid lubricant or a lubricant composed of alkaline metal salt of sulfonic acid. Preferably, the film thickness is between 10 and 30 angstroms. This is because the thickness less than 10 angstroms can not provide sufficient improvement in friction resistance while the thickness more than 30 angstroms can not provide friction resistance at all and causes unfavorable attraction of the magnetic head.

As described above, in the magnetic recording medium comprising the nonmagnetic substrate of the crystallizable material and the lamina at least including the magnetic layer formed thereon, this invention is characterized in that the nonmagnetic substrate is selected so that its surface has a predetermined crystal grain size, thereby controlling a magnetic crystal grain size of the magnetic layer. It is thus possible to control the medium noise Nm and the S/Nm ratio and to obtain the magnetic recording medium having the excellent magnetic characteristics.

What is claimed is:

1. A magnetic recording medium comprising a crystallized glass substrate and a lamina comprising at least a magnetic layer formed thereon, wherein said crystallized glass substrate has a surface of a first crystal grain size determined by crystallized grains of the crystallized glass substrate where said magnetic layer has a second crystal grain size dominated by the first crystal grain size of the crystallized glass substrate.

2. A magnetic recording medium as claimed in claim 1, wherein said crystallized glass substrate is selected so that its surface has an average crystal grain size within a range between 3 and 28 nm while said magnetic layer has the magnetic crystal grain size within a range between 5 and 30 nm.

3. A magnetic recording medium as claimed in claim 1, wherein the magnetic layer comprises Co, Pt, and Cr.

4. A magnetic recording medium as claimed in claim 2, wherein said lamina includes an underlying layer which is formed between said crystallized glass substrate and said magnetic layer and which has a thickness selected to influence the magnetic crystal grain size of said magnetic layer.

5. A magnetic recording medium as claimed in claim 4, wherein said underlying layer has the thickness not greater than 100 nm.

6. A magnetic recording medium as claimed in claim 4, wherein said underlying layer is composed of Cr.

7. A magnetic recording medium as claimed in claim 4, wherein said lamina further comprises an intermediate layer formed between said underlying layer and said magnetic layer.

8. A magnetic recording medium as claimed in claim 7, wherein said intermediate layer is composed of a Cr alloy.

9. A magnetic recording medium as claimed in claim 7, wherein said lamina further comprises an initial layer between said crystallized glass substrate and said underlying layer.

10. A magnetic recording medium as claimed in claim 9, wherein said initial layer is composed of any one of Al, AlN, and Ti.

11. A magnetic recording medium as claimed in claim 1, wherein said nonmagnetic substrate is composed of crystallized glass.

12. A magnetic recording medium as claimed in claim 1, wherein said lamina includes an underlying layer which is formed between said crystallized glass substrate and said magnetic layer and which has a thickness selected to control the magnetic crystal grain size of said magnetic layer.

13. A magnetic recording medium as claimed in claim 12, wherein the thickness of said underlying layer is not greater than 100 nm.

14. A magnetic recording medium as claimed in claim 12, wherein said underlying layer is composed of Cr.

15. A magnetic recording medium as claimed in claim 12, wherein said lamina further comprises an intermediate layer between said underlying layer and said magnetic layer.

16. A magnetic recording medium as claimed in claim 12, wherein said lamina further comprises an initial layer between said crystallized glass substrate and said underlying layer.

17. A magnetic recording medium as claimed in claim 1, wherein said crystallized glass substrate includes a predetermined crystal.

18. A method of manufacturing a magnetic recording medium which comprises a crystallized glass substrate and a magnetic layer, comprising the steps of:

selecting said crystallized glass substrate which has a first crystal grain size; and depositing, over the crystallized glass substrate, the magnetic layer which has a second crystal grain size dominated by the first crystal grain size of the crystallized grains of the crystallized glass substrate.

19. A method as claimed in claim 18, further comprising the step of forming an underlying layer between said crystallized glass substrate and said magnetic layer, a film thickness of said underlying layer being selected to thereby influence said magnetic crystal grain size of said magnetic layer.

20. A method as claimed in claim 19, wherein said underlying layer has a thickness not greater than 100 nm.

21. A method as claimed in claim 19, wherein said underlying layer is composed of Cr.

22. A method as claimed in claim 19, further comprising the step of forming an intermediate layer between said underlying layer and said magnetic layer.

23. A method as claimed in claim 22, further comprising the step of forming an initial layer between said crystallized glass substrate and said underlying layer.

24. A magnetic recording medium as claimed in claim 23, wherein the magnetic layer is overlaid on an underlying layer.

25. A magnetic recording medium as claimed in claim 24, wherein the underlying layer is composed of Cr.

26. A method as claimed in claim 18, wherein the magnetic layer comprises Co, Pt, and Cr.

27. A method as claimed in claim 26, wherein the magnetic layer is overlaid on an underlying layer.

28. A method as claimed in claim 27, wherein the underlying layer is composed of Cr.

* * * * *